US009240843B1

(12) United States Patent
Malouin et al.

(10) Patent No.: US 9,240,843 B1
(45) Date of Patent: Jan. 19, 2016

(54) METHOD AND APPARATUS FOR BLIND TIME SKEW COMPENSATION FOR COHERENT OPTICAL RECEIVERS

(71) Applicant: Juniper Networks, Inc., Sunnyvale, CA (US)

(72) Inventors: Christian Malouin, San Jose, CA (US); Philip A. Thomas, San Jose, CA (US); Murat Arabaci, Santa Clara, CA (US); Bo Zhang, San Jose, CA (US); Theodore J. Schmidt, Gilroy, CA (US); Roberto Marcoccia, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 307 days.

(21) Appl. No.: 13/730,246

(22) Filed: Dec. 28, 2012

(51) Int. Cl.
*H04B 10/06* (2006.01)
*H04B 10/61* (2013.01)

(52) U.S. Cl.
CPC .................... *H04B 10/616* (2013.01)

(58) Field of Classification Search
CPC .................................................. H04B 10/616
USPC .................................................. 398/202–214
See application file for complete search history.

(56) References Cited

U.S. PATENT DOCUMENTS

| | | | | |
|---|---|---|---|---|
| 7,894,728 | B1 * | 2/2011 | Sun ...................... | H04B 10/60 398/208 |
| 8,787,777 | B2 * | 7/2014 | Goldfarb .................... | 398/206 |
| 8,923,708 | B2 * | 12/2014 | Tanimura ............ | H04B 10/613 398/209 |
| 2010/0209121 | A1 * | 8/2010 | Tanimura ....................... | 398/202 |
| 2011/0150506 | A1 * | 6/2011 | Tanimura .............. | H04B 10/697 398/208 |
| 2011/0229127 | A1 * | 9/2011 | Sakamoto et al. ............. | 398/25 |
| 2011/0318005 | A1 * | 12/2011 | Yoshihara ............ | H04B 10/611 398/45 |
| 2012/0020660 | A1 * | 1/2012 | Le Taillandier De Gabory ............. | H04B 10/0775 398/25 |
| 2012/0189320 | A1 * | 7/2012 | Zelensky et al. .............. | 398/158 |
| 2012/0213510 | A1 * | 8/2012 | Stojanovic ....................... | 398/25 |
| 2012/0224847 | A1 * | 9/2012 | Ibragimov et al. .............. | 398/16 |
| 2012/0237202 | A1 * | 9/2012 | Abe ..................... | H04B 10/616 398/16 |
| 2012/0263456 | A1 * | 10/2012 | Tanaka et al. ................... | 398/25 |
| 2013/0051790 | A1 * | 2/2013 | Yasuda .............. | H04B 10/6151 398/16 |
| 2013/0084080 | A1 * | 4/2013 | Shibutani ........... | H04B 10/6161 398/208 |
| 2013/0287390 | A1 * | 10/2013 | Abe et al. ........................ | 398/26 |
| 2013/0287410 | A1 * | 10/2013 | Leven et al. ................... | 398/208 |

OTHER PUBLICATIONS

Z. Tao et al. "Simple, Robust, and Wide-Range Frequency Offset Monitor for Automatic Frequency Control in Digital Coherent Receivers" Conference on Optical Fiber communication/National Fiber Optic Engineers Conference, 2008, Feb. 24-28, 2008, 2 pages.

(Continued)

*Primary Examiner* — Ken Vanderpuye
*Assistant Examiner* — Dibson Sanchez
(74) *Attorney, Agent, or Firm* — Cooley LLP (57) ABSTRACT

In some embodiments, an apparatus includes a coherent optical receiver that can receive during a first time period a set of in-phase signals and a set of quadrature signals having a skew from the set of in-phase signals. The coherent receiver can blindly determine a delay between the set of in-phase signals and the set of quadrature signals based on the set of in-phase signals and the set of quadrature signals. The delay includes an intersymbol portion and an intrasymbol portion. The coherent optical receiver can apply the delay at a second time after the first time period such that a skew after the second time is less than the skew at the first time period.

21 Claims, 8 Drawing Sheets

(56) References Cited

OTHER PUBLICATIONS

Kazuro Kikuchi, "Chapter 2, Coherent Optical Communications: Historical Perspectives and Future Directions" M. Nakazawa et al. (eds.), *High Spectral Density Optical Communication Technologies*, Optical and Fiber Communications Reports 6, DOI 10.1007/978-3-642-10419-0_2, © Springer-Verlag Berlin Heidelberg 2010, pp. 11-49.

Jens C. Rasmussen et al. "Digital Coherent Receiver Technology for 100-Gb/s Optical Transport Systems" Fujitsu Sci. Tech. J., vol. 46, No. 1, pp. 63-71 (Jan. 2010), pp. 63-71.

\* cited by examiner

Receive, at a first time a set of in-phase signals and a set of quadrature signals having a skew from the set of in-phase signals.
402

↓

Sweep, a set of index delays associated with at least one of the set of in-phase signals or the set of quadrature signals to calculate a set of error signals.
404

↓

Identify, an intersymbol portion of the skew corresponding to an index delay from the set of index delays based on an error signal from the set of error signals for that index delay being greater than the remaining error signals.
406

↓

Apply, the delay to the coherent optical receiver such that a skew at a second time after the first time is less than the skew at the first time.
408

Receive, at a first time a set of in-phase signals and a set of quadrature signals having a skew from the set of in-phase signals.
502

↓

Resample, at least one of the set of in-phase signals or the set of quadrature signals to produce at least one of a set of resampled in-phase signals or a set of resampled quadrature signals.
504

↓

Sweep, a set of index delays associated with at least one of the set of resampled in-phase signals or the set of resampled quadrature signals to calculate a set of error signals associated with a difference between the wavelength of the local carrier associated with the coherent optical receiver and the local carrier associated with the transmitter.
506

↓

Identify, an intrasymbol portion of the skew corresponding to an index delay from the set of index delays based on an error signal from the set of error signals for that index delay being greater than the remaining error signals.
508

↓

Apply, the intrasymbol delay to the coherent optical receiver such that a skew at a second time after the first time is less than the skew at the first time.
510

FIG. 8

METHOD AND APPARATUS FOR BLIND TIME SKEW COMPENSATION FOR COHERENT OPTICAL RECEIVERS

BACKGROUND

Some embodiments described herein relate generally to methods and apparatus for the blind time skew detection and compensation for coherent optical receivers.

Known coherent optical receivers typically use analog-to-digital converters (ADCs) to digitally sample the received signal. After digitization (due to the coherent detection of the optical electric field), the signal can be processed and optical and/or electrical impairments can be compensated using various digital signal processing (DSP) techniques. Before digitization, the signal coherently beats with a reference local oscillator via a down converter (or optical hybrid) that can introduce time skews between the in-phase (I-tributary) and the quadrature (Q-tributary) of the coherent optical receiver.

Typically, one ADC is used for the real (in phase) signal component and another ADC is used for the imaginary signal component for each polarization. The two ADCs may not have a mechanism to synchronize with each other after being powered up. This can result in an unpredictably large time skew in the range of several hundreds of symbols. If the time skew between the I-tributary and the Q-tributary is greater than a threshold (e.g., 10% of the symbol duration), an unacceptable performance penalty occurs. For example, at 32 Gbaud, a time skew greater than 3 ps produces a non-negligible penalty.

Accordingly, a need exists for methods and apparatus for time skew detection and compensation of coherent optical receivers.

SUMMARY

In some embodiments, an apparatus includes a coherent optical receiver that can receive during a first time period a set of in-phase signals and a set of quadrature signals having a skew from the set of in-phase signals. The coherent receiver can blindly determine a delay between the set of in-phase signals and the set of quadrature signals based on the set of in-phase signals and the set of quadrature signals. The delay includes an intersymbol portion and an intrasymbol portion. The coherent optical receiver can apply the delay at a second time after the first time period such that a skew after the second time is less than the skew at the first time period.

DETAILED DESCRIPTION

In some embodiments, an apparatus includes a coherent optical receiver that can receive during a first time period a set of in-phase signals and a set of quadrature signals having a skew from the set of in-phase signals. The coherent optical receiver can blindly determine a delay between the set of in-phase signals and the set of quadrature signals based on the set of in-phase signals and the set of quadrature signals. The delay includes an intersymbol portion and an intrasymbol portion. The coherent optical receiver can apply the delay at a second time after the first time period such that a skew after the second time is less than the skew at the first time period.

In some embodiments, an apparatus includes a coherent optical receiver that can receive from a transmitter during a first time period a set of in-phase signals and a set of quadrature signals having a skew from the set of in-phase signals. The set of in-phase signals and the set of quadrature signals are associated with a local oscillator signal having a wavelength different from a wavelength of an optical carrier signal of a transmitter. The coherent optical receiver can sweep a set of index delays associated with at least one of the set of in-phase signals or the set of quadrature signals to calculate a set of error signals associated with a difference between the wavelengths of the local oscillator signal associated with the coherent optical receiver and the optical carrier signal associated with the transmitter. The intersymbol portion of the delay corresponds to an index delay from the set of index delays when an error signal from the set of error signals for that index delay is greater than the remaining error signals. The coherent optical receiver can apply the delay to an analog-digital converter of the coherent optical receiver such that a skew at a second time after the first time period is less than the skew at the first time period.

In some embodiments, a method includes receiving at a first time a set of in-phase signals and a set of quadrature signals having a skew from the set of in-phase signals. The method includes sweeping a set of index delays associated with at least one of the set of in-phase signals or the set of quadrature signals to calculate a set of error signals. The method includes identifying an intersymbol portion of the delay corresponding to an index delay from the set of index delays based on an error signal from the set of error signals for that index delay being greater than the remaining error signals. The method further includes applying the delay to the coherent optical receiver such that a skew at a second time after the first time is less than the skew at the first time.

Coherent optical communication systems refer to optical systems that use both magnitude and phase information for transmitting and receiving data. In coherent optical communication systems, the signal reception photonics can rely on a beating between a received signal and a local reference signal (also referred to as a local oscillator signal) that maps both magnitude and phase information of the received optical signal to a measurable voltage or current. As illustrated in more detail herein, the signal reception photonics can include optical hybrid mixers to convert the received optical signal into the pairs (e.g., in-phase and quadrature phase) of data streams, referred to as I and Q data streams for transmission.

As used in this specification, the singular forms "a," "an" and "the" include plural referents unless the context clearly dictates otherwise. Thus, for example, the term "a device" is intended to mean a single device or a combination of devices.

Figure 1:
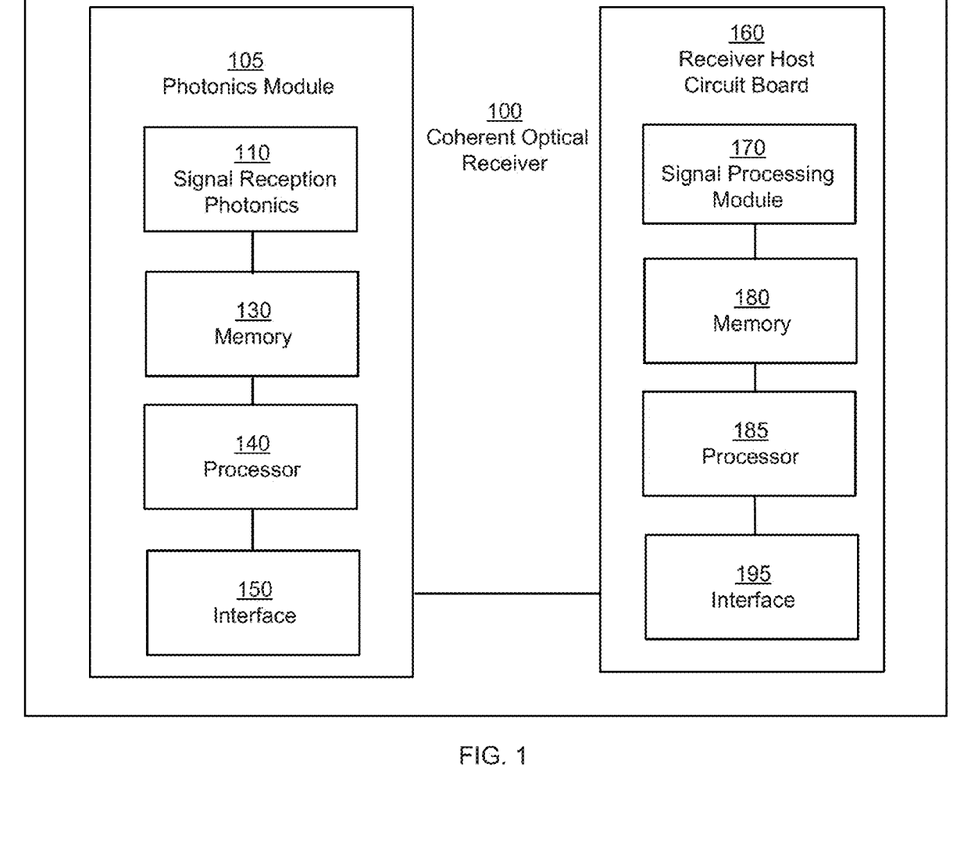
FIG. 1 is a logical block diagram of a coherent optical receiver, according to an embodiment.

FIG. 1 is a logical block diagram of a coherent optical receiver 100, according to an embodiment. The coherent optical receiver 100 includes a photonics module 105 and a receiver host circuit board 160. The photonics module 105 includes the signal reception photonics 110, a memory 130, a processor 140 and an interface 150, each of which can be connected to any of the others. The memory 130 can be, for example, a random access memory (RAM), a memory buffer, a hard drive, a database, an erasable programmable read-only memory (EPROM), an electrically erasable read-only memory (EEPROM), a read-only memory (ROM), a flash memory, and/or so forth. The memory 130 can store instructions to cause the processor 140 to execute modules, processes and/or functions associated with the photonics module 105 and/or the coherent optical receiver 100. The processor 140 can be, for example, a general purpose processor, a Field Programmable Gate Array (FPGA), an Application Specific Integrated Circuit (ASIC), a Digital Signal Processor (DSP), and/or the like. The processor 140 can run and/or execute application processes and/or other modules, processes and/or functions associated with the coherent optical receiver 100. The signal reception photonics 110 can include a variety of photonic structures that can be used for receiving signals from a transmitter such as, for example, polarization beam splitters, a local oscillator, optical hybrid mixers, and photo-receivers. A detailed description of the different components of the signal reception photonics 110 and their functionalities will be provided in FIG. 2 below.

The receiver host circuit board 160 includes a signal processing module 170, a memory 180, a processor 185 and an interface 195, each of which can be connected to any of the others. The signal processing module 170 includes a variety of electronics that can be used to process the in-phase portion (I-tributary) and quadrature portion (Q-tributary) of the received signal, and to detect and compensate for the I/Q skew. The signal processing module 170 can include, for example, analog-digital converters, filters, equalizers, electronics for carrier signal (local oscillator signal) phase estimation, electronics for carrier signal (local oscillator signal) frequency estimation, slicers, and timing recovery circuits. The memory 180 can be, for example, a random access memory (RAM), a memory buffer, a hard drive, a database, an erasable programmable read-only memory (EPROM), an electrically erasable read-only memory (EEPROM), a read-only memory (ROM), a flash memory, and/or so forth. The memory 180 can store instructions to cause the processor 185 to execute modules, processes and/or functions associated with the signal processing module 170 and/or the coherent optical receiver 100. The processor 185 can be, for example, a general purpose processor, a Field Programmable Gate Array (FPGA), an Application Specific Integrated Circuit (ASIC), a Digital Signal Processor (DSP), and/or the like. The processor 185 can run and/or execute application processes and/or other modules, processes and/or functions associated with the coherent optical receiver 100. A detailed description of the different components of the signal processing module 170 and their functionalities will be provided in FIG. 3 below.

The coherent optical receiver 100 can have a portion associated with a first polarization and a portion associated with a second polarization orthogonal to the first polarization. A skew can be associated with each of the first polarization and the second polarization. With respect to one polarization, the coherent optical receiver 100 can receive during a first time period a set of in-phase signals and a set of quadrature signals having a skew from the set of in-phase signals. The coherent optical receiver 100 can blindly determine a delay between the set of in-phase signals and the set of quadrature signals based on the set of in-phase signals and the set of quadrature signals. Blind determination of the delay between the set of in-phase signals and the set of quadrature signals involves determining the delay without the generation of specialized training sequences (or bit patterns). The delay includes an intersymbol portion and an intrasymbol portion. The coherent optical receiver 100 can apply the delay to an analog-to-digital converter such that a skew at a second time after the first time period is less than the skew at the first time period. The delay after the second time can be, for example, no greater than a threshold (e.g., 10% of a symbol unit interval) associated with the set of in-phase signals and the set of quadrature signals. The coherent optical receiver 100 can apply the delay without using a training signal. The coherent optical receiver 100 can receive the set of in-phase signals and the set of quadrature signals during the first time period over an optical link having various optical impairments such as, for example, optical noise, chromatic dispersion, polarization mode dispersion, and/or an unsynchronized sampling clock.

The coherent optical receiver 100 can sweep a set of index delays associated with at least one of the set of in-phase signals or the set of quadrature signals associated with either the first polarization or a second polarization to calculate a set of error signals associated with a difference between the wavelength of the local oscillator signal associated with the coherent optical receiver 100 and the optical carrier signal associated with the transmitter. The intersymbol portion of the delay corresponds to an index delay from the set of index delays when an error signal from the set of error signals for that index delay is greater than the remaining error signals. The set of error signals associated with the intersymbol portion of the delay is a first set of error signals, and the set of index delays associated with the intersymbol portion of the delay is a first set of index delays.

In some configurations, the coherent optical receiver 100 can resample at least one of the set of in-phase signals or the set of quadrature signals to produce at least one of a set of resampled in-phase signals or a set of resampled quadrature signals. The coherent optical receiver 100 can sweep a second set of index delays associated with the at least one of the resampled set of in-phase signals or the set of resampled quadrature signals to calculate a second set of error signals associated with a difference between the wavelength of the local oscillator signal associated with the coherent optical receiver and the optical carrier signal associated with the transmitter. The intrasymbol portion of the delay corresponds to an index delay from the set of index delays when an error signal from the set of error signals for that index delay is greater than the remaining error signals. The set of error signals associated with the intrasymbol portion of the delay is a second set of error signals, and the set of index delays associated with the intrasymbol portion of the delay is a second set of index delays.

In other configurations, the coherent optical receiver 100 can maximize a precision of an analog-to-digital converter (ADC) of the coherent optical receiver 100. The coherent optical receiver 100 can calculate a second set of error signals, after the precision of the ADC has been maximized. The coherent optical receiver 100 can sweep, after the precision of the ADC has been maximized, a second set of index delays associated with at least one of the set of in-phase signals or the set of quadrature signals to identify the intrasymbol portion of the delay corresponding to an index delay from the second set of index delays when an error signal from the second set of error signals for that index delay is greater than the remaining error signals.

Figure 2:
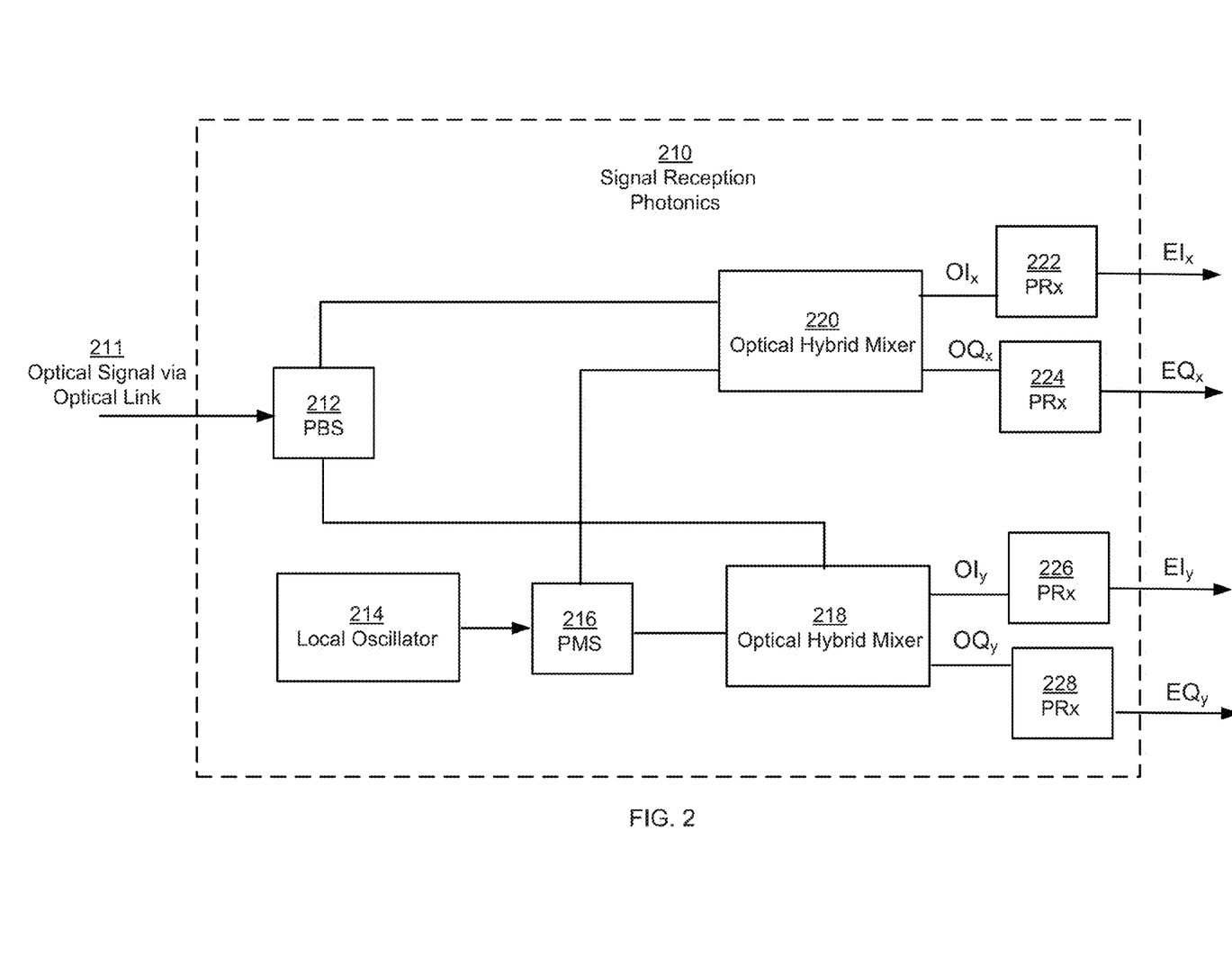
FIG. 2 is a block diagram of the signal reception photonics, according to an embodiment.

FIG. 2 is a block diagram of the signal reception photonics 210, according to an embodiment. The signal reception photonics 210 of FIG. 2 can correspond, for example, to the signal reception photonics 120 shown in FIG. 1. The different components of the signal reception photonics 210 are illustrated for quadrature phase shift keying (QPSK) modulation. The signal reception photonics 210 may include additional, fewer, or different components than those illustrated based on the desired QPSK modulation. In alternate examples, the signal reception photonics 210 can include different components for different modulation schemes. For example, if binary phase-shift keying (BPSK) modulation is used, the signal reception photonics 210 can include components for coherent BPSK modulation. In general, the signal reception photonics 210 includes components used for the desired type of coherent communication, including complex modulation schemes such as, for example, multi-level quadrature amplitude modulation (M-QAM where M>4).

In phase shift keying (PSK) modulation, binary ones and zeros are represented by changing, or modulating, the phase of a carrier wave sometimes referred to as a lightwave or an optical carrier signal. In this manner, both the magnitude and the phase of the optical signal are used to transmit data. Hence, both the magnitude and the phase information of the received optical signal may be used to recover the transmitted data (e.g., the binary ones and zeros represented by changing or modulating the phase of a carrier wave). In some instances, the modulated lightwave in one polarization may be multiplexed with another modulated polarization, for example, orthogonal to the first polarization, to produce a polarization multiplexed (PM) signal, such as PM-QPSK. The polarizations of the lightwave signals can be selected to be orthogonal to allow for a simple polarization beam splitter 212 for polarization demultiplexing when the signal reception photonics 210 receives a signal from, for example, a transmitter via an intervening a network.

As illustrated in FIG. 2, the signal reception photonics 210 can include a polarization beam splitter (PBS) 212, a local oscillator (LO) 214, a polarization maintaining splitter (PMS) 216, optical hybrid mixers 218 and 220, and photo-receivers (PRx) 222-228. PRx 222-228 can convert the magnitude of an optical signal (or an optical signal component) to an electrical representation. PBS 212 can receive an optical signal from a transmitter via an optical link 211 and can split the received optical signal into a first optical signal with a polarization and a second optical signal with another polarization (substantially orthogonal to the polarization of the first optical signal). Each optical hybrid mixer 218 and 220 can receive the respective optical signals from the PBS 212. The local oscillator 214 can be a laser that provides, for example, a phase reference used in a coherent optical receiver to recover the data with the optical signal 211 received by the signal reception photonics 210. In some instances, the local oscillator 214 may be a free running oscillator where the laser signal output by the local oscillator 214 may not be phase-locked with the optical signal 211 that is received by the PBS 212.

Polarization maintaining splitter (PMS) 216 can receive the optical signal from the local oscillator 214 and can split that optical signal into (at least) one local oscillator signal on a first light path and another local oscillator signal on a second light path. Each optical hybrid mixer 218 and 220 can receive the respective local oscillator signal from the first light path and second light paths. In some instances, the location of PBS 212 and PMS 216 may be swapped with no loss of functionality, provided the light from the local oscillator 214 is split into two substantially orthogonally polarized optical signals. Optical hybrid mixers 218 and 220 each can mix the respective optical signals from PBS 212 with the respective local oscillator signal from PMS 216, and outputs the optical data stream representing the in-phase (I) and quadrature (Q) components of the QPSK modulated signal. For example, optical hybrid mixer 218 outputs the $OI_y$ and $OQ_y$ optical data streams, and optical hybrid mixer 220 outputs the $OI_y$ and $OQ_x$ optical data streams. In some instances, optical hybrid mixers 218 and 220 can be 90 degree optical hybrid mixers. Also, in some other instances, the $OI_x$, $OQ_x$, $OI_y$, and $OQ_y$ optical data streams may be differentially-encoded data streams. The $OI_x$ data stream is proportional to the real aspect of the complex portion of the optical signal 211 along the x-polarization (horizontal) direction, and the $OQ_x$ data stream is proportional to the imaginary aspect of the complex portion of the optical signal 211 along the x-polarization (horizontal) direction. The $OI_y$ data stream is proportional to the real aspect of the complex portion of the optical signal 211 along the y-polarization (vertical) direction, and the $OQ_y$ data stream is proportional to the imaginary aspect of the complex portion of the optical signal 211 along the y-polarization (vertical) direction.

Photo-receivers 222-228 can receive respective optical signals of the $OI_x$, $OQ_x$, $OI_y$, and $OQ_y$ optical data streams and convert these optical signals into analog electrical data streams $EI_x$, $EQ_x$, $EI_y$, and $EQ_y$, respectively. Photo-receivers 222-228 can be, for example, a single photo-diode or a pair of substantially balanced photo-diodes. In some instances, a transimpedence amplifier (TIA) element for each photo-receiver 222-228 can be used to convert the photo-current from the photo-diode(s) to a voltage representation. Such TIA elements, however, may not be included in every case. In this manner, the signal reception photonics 210 can convert a QPSK-modulated optical signal 211 into analog electrical I-data-stream pairs and Q-data-stream pairs representing the optical QPSK signal for further processing by the signal processing module (e.g., signal processing module 170 in FIG. 1).

Figure 3:
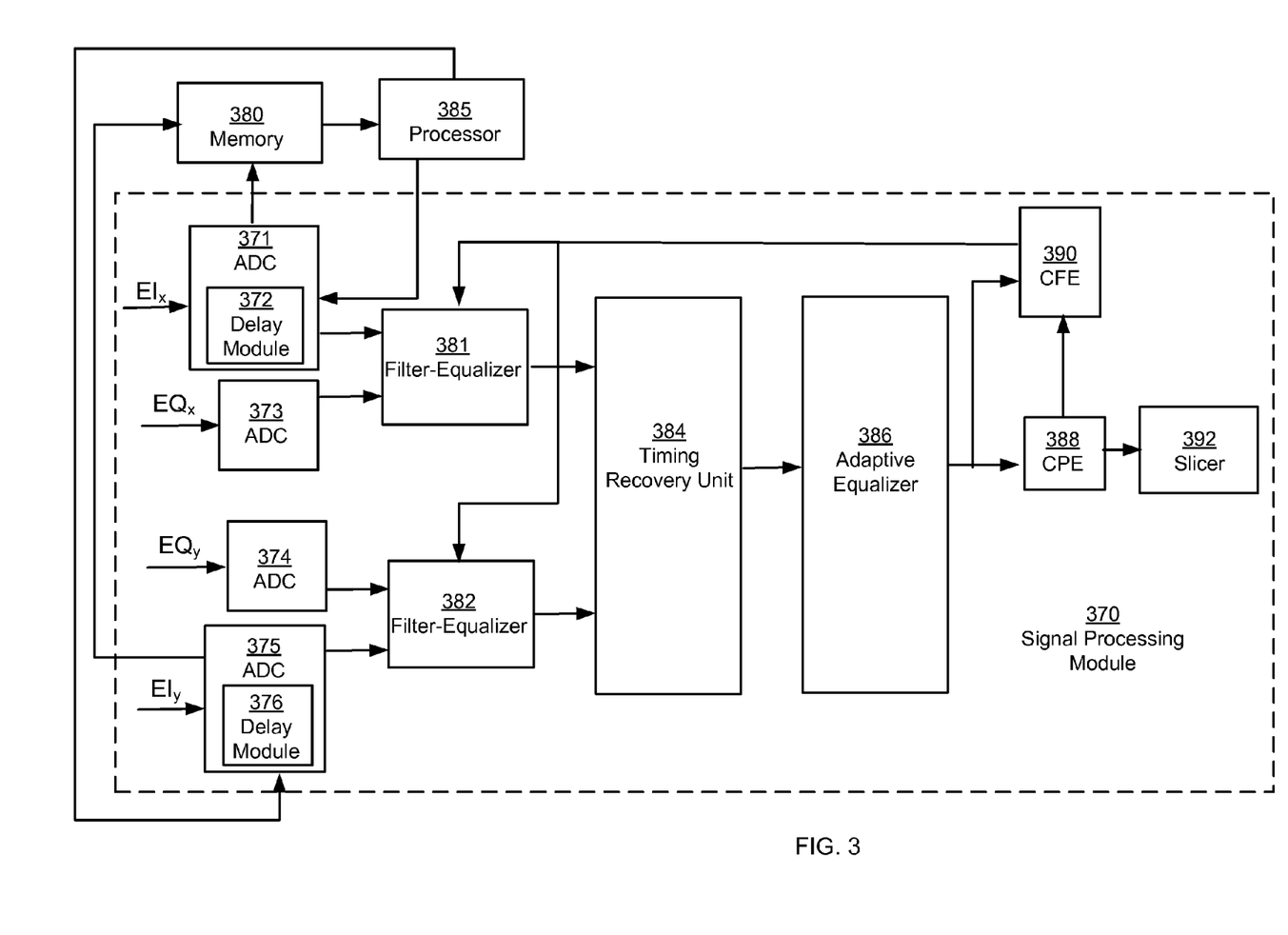
FIG. 3 is a block diagram of the signal processing module that is operably coupled to a memory and a processor, according to an embodiment.

FIG. 3 is a block diagram of the signal processing module 370 that is operably coupled to a memory 380 and a processor 385, according to an embodiment. The signal processing module 370 of FIG. 3 can correspond, for example, to the signal processing module 170 of FIG. 1. The signal processing module 370 includes analog-digital converters (ADCs) 371, 373, 374 and 375, filter-equalizers 381-382, a timing recovery unit 384, an adaptive equalizer 386, a carrier phase estimator (CPE) 388, a carrier frequency estimator (CFE) 390 and a slicer 392. ADCs 371 and 375 include a delay module 372 and 376, respectively.

To convert the analog electrical data streams ($EI_x$, $EQ_x$, $EI_y$, and $EQ_y$) into digital data streams, ADCs 371, 373, 374 and 375 sample the analog I and Q electrical data streams, and for each sample, assign the sample a value proportional to the ADC resolution. This form of ACD resolution may be referred to as the number of bits of resolution. In the techniques described herein, ADCs 371, 373, 374 and 375 sample the analog I and Q electrical data streams substantially at or beyond the Nyquist rate to minimize or reduce any aliasing effects. The Nyquist rate is two times the symbol rate of the analog electrical data streams.

For example, ADCs 371, 373, 374 and 375 can sample analog I and Q electrical data streams, for example, at a rate that is slightly less than the Nyquist rate (e.g., slightly less than twice the symbol rate), at the Nyquist rate, or at a rate greater than the Nyquist rate. While sampling at substantially the Nyquist rate or at a greater rate can minimize or reduce aliasing effects, the amount of samples that can to be processed per second increases rapidly with the higher sampling rates. For example, for an analog data symbol rate of 25 Gbaud, if the sampling rate of ADCs 371, 373, 374 and 375 is 50 Gsamples/s (twice the symbol rate), then the output of each one of ADCs 371, 373, 374 and 375 is a digital electrical data stream of 50 Gsamples/s.

The filter-equalizers 381 and 382 each can be a two component unit that can include, for example, two digital filters (for both I and Q signals) and one chromatic dispersion (CD) equalizer. The digital filters can receive the respective digital data streams from the ADCs 371, 373, 374 and 375. The digital filters can filter the digital electrical data streams received from ADCs 371, 373, 374 and 375 to output at a digital data stream at an effective sampling rate that is less than the sampling rate at which ADCs 371, 373, 374 and 375 sampled the analog electrical data, less than twice the symbol rate of the analog electrical data streams received by ADCs 371, 373, 374 and 375, and yet greater than or equal to the symbol rate of the analog electrical data streams received by ADCs 371, 373, 374 and 375. The filtered digital electrical data streams that are output by digital filters, however, are not corrupted from aliasing effects that would have occurred had the ADCs 371, 373, 374 and 375 sampled the analog data at a sampling rate that is substantially similar to the effective sampling rate.

Hence, the digital filter component of the filter-equalizers 381 and 382 allows the various components of signal processing module 370 that are further downstream from ADCs 371, 373, 374 and 375 to avoid processing large amounts of data. Processing such relatively large amounts of data would otherwise involve downstream components of the signal processing module 370 to be larger in size and consume a large amount of power. It is desirable to sample analog data at substantially at the Nyquist rate or higher rate to mitigate aliasing effects, while at the same time, minimize or reduce the number of samples of data to be processed by the components of the signal processing unit 370 to reduce the size and power consumption of the components of the signal processing unit 370.

As an example, assume that the symbol rate of the analog electrical data streams that is output by the signal reception photonics 210 equals R, where R is 25 Gbaud. In this example, ADCs 371, 373, 374 and 375 can receive analog electrical data streams having a symbol rate of R (25 Gbaud), and can sample the analog electrical data streams at a sampling rate of 2×R, which is represented as $R_s$ (i.e., $R_s$=2× R=2×25=50 Gsamples/s of data). Each one of ADCs 371, 373, 374 and 375 outputs a digital data stream, where each of the digital data streams include at least 2×R samples for processing per second (50 Gsamples/s). In this example, the digital filters can digitally filter the digital data streams and output filtered digital data streams at an effective sampling rate of less than 2×R, but greater than or equal to R. For example, if the effective sampling rate of the output from digital filters is N, then N is less than 2×R, and greater than or equal to R (i.e., R≤N<2×R). Hence, N can be, for example, 31.25 Gsamples/s (i.e., 25≤31.25<50 Gsamples/s).

A second component of the filter-equalizers 381-382 is the chromatic dispersion (CD) equalizers. Within each filter-equalizer block 381-382, a single CD equalizer can receive one pair of the I/Q digitized data streams (i.e., the digitized $EI_x$ and $EQ_x$ data streams output by the first pair of digital filters, and the digitized $EI_y$ and $EQ_y$ data streams output by the second pair of digital filters, respectively). The CD equalizers can implement a complex filter on received digital electrical data streams to compensate for optical distortion that is represented electrically on the digital electrical data streams output by the digital filters described above.

For example, the CD equalizers can compensate for chromatic dispersion of the optical link that transmits the optical signal 211 from a transmitter (e.g., the optical link that transmits the optical signal 211 in FIG. 2). If the signal reception photonics (e.g., signal reception photonics 210 in FIG. 2) receives an optical signal in a long haul application (e.g., from a transmitter that is hundreds of miles away), the digital electrical data streams that are output by the digital filters (within the filter-equalizers 381-382) can be corrupted by chromatic dispersion. This chromatic dispersion is an example of optical distortion that is part of the received optical signal 211 and can be detected and compensated by the CD equalizers.

The ADCs 371, 373, 374 and 375, the digital filters associated with the filter-equalizers 381-382, and the CD equalizers associated with the filter-equalizers 381-382 shown and described herein can include, for example, any of the features shown and described in U.S. patent application Ser. No. 13/434,532, entitled "Pluggable Photonics for Coherent Optical Communication," filed on May 29, 2012, and in U.S. patent application Ser. No. 13/434,213, entitled "Processing Data in a Coherent Optical Communication System," filed on May 29, 2012, both which are incorporated by reference herein in their entirety.

The timing recovery unit 384 can receive data streams from filter-equalizers 381 and 382 and perform timing recovery. For example, timing recovery unit 384 can perform symbol timing using interpolation and Timing Error Detector (TED) to achieve symbol timing recovery, although other timing recovery techniques can also be implemented. One example of the timing recovery technique is described in F. M. Gardner, "BPSK/QPSK Timing-Error Detector for Sampled Receivers," IEEE Transactions on Communications, vol. COM-34, No. 5, May 1986, and is incorporated by reference in its entirety.

The adaptive equalizer 386 can receive the data streams from timing recovery unit 384 and perform several compensations to recover the transmitted data. For example, in some instances, the CD equalizers contained within the filter-equalizer 381 and 382 may not be able to compensate for all of the chromatic dispersion. In such instances, the adaptive equalizer 386 can compensate for any remaining chromatic dispersion. In addition, the adaptive equalizer 386 can also un-mix the polarization of the received data streams (i.e., compensate for polarization mode dispersion). For example, the adaptive equalizer 386 can compensate for any polarization mixing in the optical link (e.g., due to optical cross-talk).

Carrier phase estimation unit (CPE) 388 and carrier frequency estimation unit (CFE) 390 fixes or corrects the phase and the frequency offset (between the received optical signal 211 and the local oscillator signal associated with the coherent optical receiver) of the data stream. For example, the photonics module (e.g., photonics module 105 in FIG. 1) can include a free-running local oscillator (e.g., local oscillator 214 in FIG. 2) used to recover the optical $OI_x$, $OQ_x$, $OI_y$, and $OQ_y$ portions in the data streams. Because the local oscillator can be a free-running oscillator, the $OI_x$ and $OQ_x$ data streams can be orthogonal to one another, and the $OI_y$ and $OQ_y$ data streams can also be orthogonal to one another. The phase of each data stream may, however, not be fixed. Hence, CPE 388 and CFE 390 function in feedback to estimate the relative frequency and phase offset between the received optical signal 211 and the local oscillator signal to track the phase of the data streams. The slicer 392 can receive the data streams from CPE 388 and can digitize the data streams into binary sequences for further transmission to other components within the coherent optical receiver or to other devices outside of the coherent optical receiver.

The memory 380 and the processor 385 can be used to detect and compensate for the skew associated with the in-phase portion (I-tributary) and quadrature portion (Q-tributary) of the coherent optical receiver (e.g., coherent optical receiver 100 in FIG. 1). The memories 380 and the processor 385 can be used to implement a blind method to detect and compensate for the skew that does not involve the generation of special training sequences. An advantage of employing a blind method to compensate for the skew is that the coherent optical transmitters and receivers can facilitate intercompatability with other products. Additionally, blind methods to compensate for the skew can allow the detection of very large time skews (in the order of hundreds of symbol unit intervals). Methods to detect for skew that are based on training sequences (or bit patterns), however, have limited time skew detection range.

Figure 4:
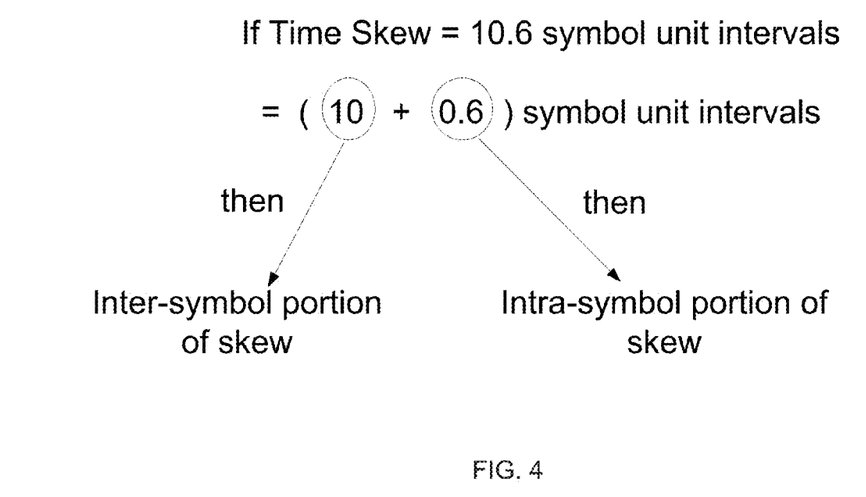
FIG. 4 is an example of the difference between the intersymbol portion of a skew and the intra-symbol portion of a skew.

The skew associated with the in-phase portion (I-tributary) and quadrature portion (Q-tributary) of the optical coherent receiver includes an intersymbol portion and an intrasymbol portion. The intersymbol portion of the skew is the skew associated with multiple symbol unit intervals (multiple-UIs) and the intrasymbol portion of the skew is the skew associated with sub-symbol unit intervals (less that one UI). FIG. 4 shows an example of the difference between the intersymbol portion of the skew and the intrasymbol portion of the skew for a skew of 10.6 symbol unit intervals (UIs).

The digitized data stream from the ADC 371 that represents the in-phase portion ($I_x$) of the received optical signal 211 along the x-direction (horizontal) polarization and the digitized data stream from the ADC 375 that represents the in-phase portion ($I_y$) of the received optical signal 211 along the y-direction (vertical) polarization is sent to the memory 380 at a first time. The memory 380 each can be, for example, a random access memory (RAM), a memory buffer, a hard drive, a database, an erasable programmable read-only memory (EPROM), an electrically erasable read-only memory (EEPROM), a read-only memory (ROM), a flash memory, and/or so forth. The memory 380 can store the digitized data streams received from the ADCs 371 and 375 in, for example, a lookup table or a database. The memory 380 can also store instructions to cause the processor 385, respectively to execute modules, processes and/or functions associated with detecting and compensating for the intersymbol and intrasymbol portion of the skew between the in-phase portion (I-tributary) and quadrature portion (Q-tributary) of the coherent optical receiver. The processor 385 can each be, for example, a general purpose processor, a Field Programmable Gate Array (FPGA), an Application Specific Integrated Circuit (ASIC), a Digital Signal Processor (DSP), and/or the like.

The processor 385 can sweep a set of index delays associated with at least one of the set of in-phase signals or the set of quadrature signals to calculate a set of error signals. The processor 385 can then identify an intersymbol portion of the skew corresponding to an index delay from the set of index delays based on an error signal from the set of error signals for that index delay being greater than the remaining error signals. The processor 385 can apply the delay to the coherent optical receiver such that a skew at a second time after the first time is less than the skew at the first time. The error calculation and intersymbol time skew or delay calculation method will be discussed in greater detail below in FIG. 6.

The intrasymbol time skew or delay can also be determined by at least two techniques. First, in some configurations, at least one of the set of in-phase digital data streams or the set of quadrature digital data streams from the ADCs 371, 373, 374 and 375 are resampled at the processor 385 at a higher sampling rate of the ADCs 371, 373, 374 (e.g., resampling rate $R_s=16 \times R$, where R is the symbol rate) to produce at least one set of resampled in-phase signals or a set of resampled quadrature signals. The processor 385 can sweep a set of index delays associated with at least one of the set of resampled in-phase signals or the set of resampled quadrature signals to calculate a set of error signals associated with the difference between the wavelengths of the local oscillator signal associated with the coherent optical receiver and the optical carrier signal associated with the transmitter. The processor 385 can identify an intrasymbol portion of the skew corresponding to an index delay from the set of index delays based on an error signal from the set of error signals for that index delay being greater than the remaining error signals. The processor 385 can apply the intrasymbol delay to the coherent optical receiver such that a skew at a second time after the first time is less than the skew at the first time. The error calculation and intrasymbol time skew or delay calculation method will be discussed in greater detail below in FIG. 6.

Second, in other configurations, the processor 385 can adjust the ADCs 371 and 375 to maximize the precision of the ADCs 371 and 375. The processor 385 can recalculate the error signal (that is not resampled at a higher sampling rate than the ADC sampling rate) by sweeping a set of index delays associated with at least one of the set of in-phase signals or the set of quadrature signals to calculate a set of error signals associated with the difference between the wavelengths of the local oscillator signal associated with the coherent optical receiver and the optical carrier signal associated with the transmitter. The processor 385 can identify an intrasymbol portion of the skew corresponding to an index delay from the set of index delays based on an error signal from the set of error signals for that index delay being greater than the remaining error signals. The processor 385 can apply the intrasymbol delay to the coherent optical receiver such that a skew at a second time after the first time is less than the skew at the first time. The error calculation and intrasymbol time skew or delay calculation method will be discussed in greater detail below in FIG. 6.

The delay modules 372 and 376 are responsible for implementing the delays to compensate for the skew between the in-phase portion (I-tributary) and the quadrature portion (Q-tributary) of the coherent optical receiver. The delay modules 372 and 376 can receive a delay signal from the processor 385, and can introduce both the intersymbol delays and intrasymbol delays into at least one of the I-tributary or Q-tributary or both tributaries of the coherent optical receiver to compensate for the skew. The delay modules 372 and 376 are shown within the ADCs 371 and 375, respectively, by way of example only, and not limitation. In other configurations, the delay modules can be associated with the filter-equalizers 381-382, or the timing recovery unit 384, or can be stand-alone modules not directly within any signal processing components of the signal processing module 370. Alternatively, the delay modules can also be associated with each of the four digitized data streams representing the $EI_x$, $EQ_x$, $EI_y$, and $EQ_y$ portions of the received signal.

Figure 5A:
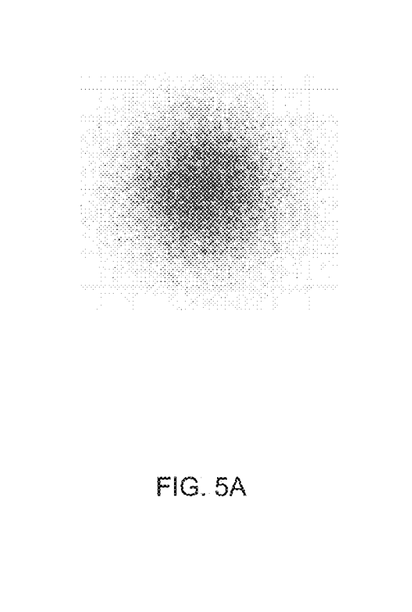
FIG. 5A shows an example of the profile of the digitized signal that includes the effects of optical impairments such as optical signal-noise, electric distortion, chromatic dispersion, polarization mode dispersion (PMD) and an unsynchronized sampling clock.

FIG. 5A shows the profile of the digitized signal that includes the effects of optical impairments such as optical noise, electric distortion, chromatic dispersion, polarization mode dispersion (PMD) and an unsynchronized sampling clock, according to an embodiment. The profile of the digitized signal that is received by the CD filter (e.g., within the filter-equalizer 381 or 382 in FIG. 3) can be corrupted due to the effects of the various optical impairments. For example, optical noise can occur due to a variety of sources that can induce noise in an optical signal such as, for example, shot noise that is associated with the particle nature of light, thermal noise from the transimpedance amplifier (TIA), residual beating of the local oscillator signal with relative intensity noise (LO-RIN), and/or the like.

The electric distortion can occur from the analog-to-digital conversion in the ADCs and can represent the difference between the actual analog value of the input signal to the ADCs and the quantized digital output value. This form of electric distortion can also be called quantization error or quantization distortion. Chromatic dispersion is a phenomenon that occurs in fiber optic cables such as, for example, the optical link used to receive the optical signal from a transmitter (e.g., optical link on which optical signal 211 is received, as shown in FIG. 2). Chromatic dispersion is the result of the different frequency components (or wavelengths) in a light beam arriving at the destination at different time periods. The result is a spreading, or dispersion, of the digital light pulses that convey digital information. This can lead to quantization errors in the digitized data stream.

Polarization mode dispersion (PMD) is a form of modal dispersion where two different polarizations of light (e.g., x and y polarization components of the received signal) in a waveguide (e.g. optical link on which optical signal 211 is received, as shown in FIG. 2) that normally travel at the same speed, travel at different speeds due to random imperfections and asymmetries, causing random spreading of optical pulses. PMD can ultimately limits the rate at which data can be transmitted over a fiber.

The unsynchronized sampling clocks can cause optical impairments because the clock used in the transmitter is not synchronized with the clock used in the coherent optical receiver. Additionally, precision limitations associated with each of the clocks can prevent the transmitter clock and the coherent optical receiver clock from being at the same value or synchronized at all times. Hence, such variations can lead to incorrect and inconsistent sampling of the received signal and also can cause quantization errors.

Figure 5B:
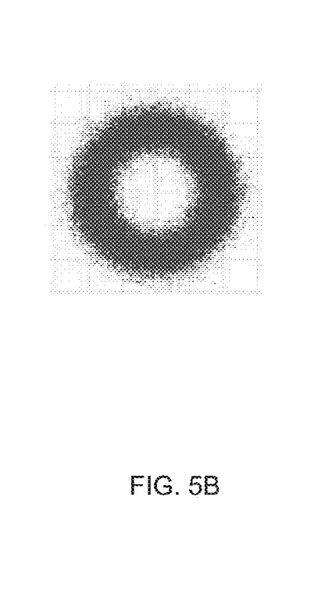
FIG. 5B shows an example of the profile of the digitized signal after compensation of electric distortion, polarization mode dispersion (PMD) and chromatic dispersion (CD).

FIG. 5B shows the profile of the digitized signal after compensation of electric distortion, polarization mode dispersion (PMD) and chromatic dispersion (CD), according to an embodiment. The profile of the digitized signal shown in FIG. 5B occurs after the adaptive equalizer (e.g., adaptive equalizer 386 in FIG. 3). The polarization demultiplexing and compensation for PMD can take place in the equalizer as described above. Additionally, compensation for CD can take place in the CD equalizers (e.g., the CD equalizers contained with the filter-equalizers 381-382 in FIG. 3) and also the equalizer. The electronic distortion that can arise from, for example, the digitization process (e.g., in the ADCs 371, 373, 374 and 375 in FIG. 3), or a physical impairment with any of the connection points associated with the photonics module or receiver host circuit board can be compensated for by the adaptive equalizer (e.g., adaptive equalizer 386 in FIG. 3) to recover the magnitude and phase information of the received optical signal.

Figure 5C:
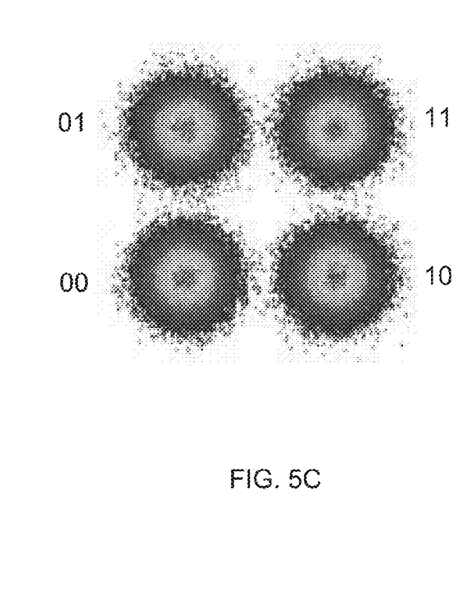
FIG. 5C shows an example of the constellation map of the digitized signal after estimation of phase and frequency offset between the signal and the local oscillator signal of the data stream.

FIG. 5C shows the constellation map of the digitized signal after estimation of phase and frequency offset between the received signal 211 and the local oscillator signal of the coherent optical receiver, according to an embodiment. As mentioned above, the carrier phase estimation unit (e.g., CPE 388 in FIG. 3) and the carrier frequency estimation unit (e.g., CFE 390 in FIG. 3) perform the carrier phase estimation and the carrier frequency estimation, respectively. Hence, the CPE and CFE can function in feedback to estimate the relative frequency and phase offset between the received signal 211 and the local oscillator signal to track the phase of the data streams. Additionally, the slicer can receive the data streams from the CPE and can digitize the data streams into binary sequences that can allow for the formation of the constellation map of the digitized signal. The 4-symbol constellation map shown in FIG. 5C is representative of quadrature phase-shift keying (QPSK) modulation, where each adjacent symbol differs by one bit. With each symbol representing one phase, the constellation map represents four phases that QPSK uses to encode two bits per symbol shown in the FIG. 5C with gray coding. This is done to minimize the bit error rate (BER) where the number of bit errors is the number of received bits of a data stream in the coherent optical receiver that have been altered due to noise, interference, distortion or bit synchronization errors.

As discussed above in connection with FIGS. 1-5, the technique proposed for time skew detection and compensation is blind and robust to optical impairments like optical noise, chromatic dispersion (CD) and unsynchronized sampling clock. The error signal "e" that can be used to calculate the frequency offset between the local oscillator signal for the receiver and the optical carrier signal for the transmitter can be computed by the following equation:

$$e = \langle Q_n I_{n-1} - I_n Q_{n-1} \rangle \quad (1)$$

where n is the sample index and I and Q are the real and imaginary parts, respectively, of the signal after digitization that can be used for frequency offset estimation. The error signal "e" is proportional to the frequency offset value within a certain range. The error signal e can be used to calculate the time skew between I tributary and the Q tributary of the coherent optical receiver. First, a non-zero value is set for the frequency offset by adjusting or approximately selecting the carrier frequency of the local oscillator (e.g., local oscillator 214 in FIG. 2). Using the error signal shown in equation (1), the index delay of one of the tributaries (I or Q) is swept and the error signal is calculated. The time skew is identified or determined when the error signal is maximized as a function of the index delay.

Figure 6:
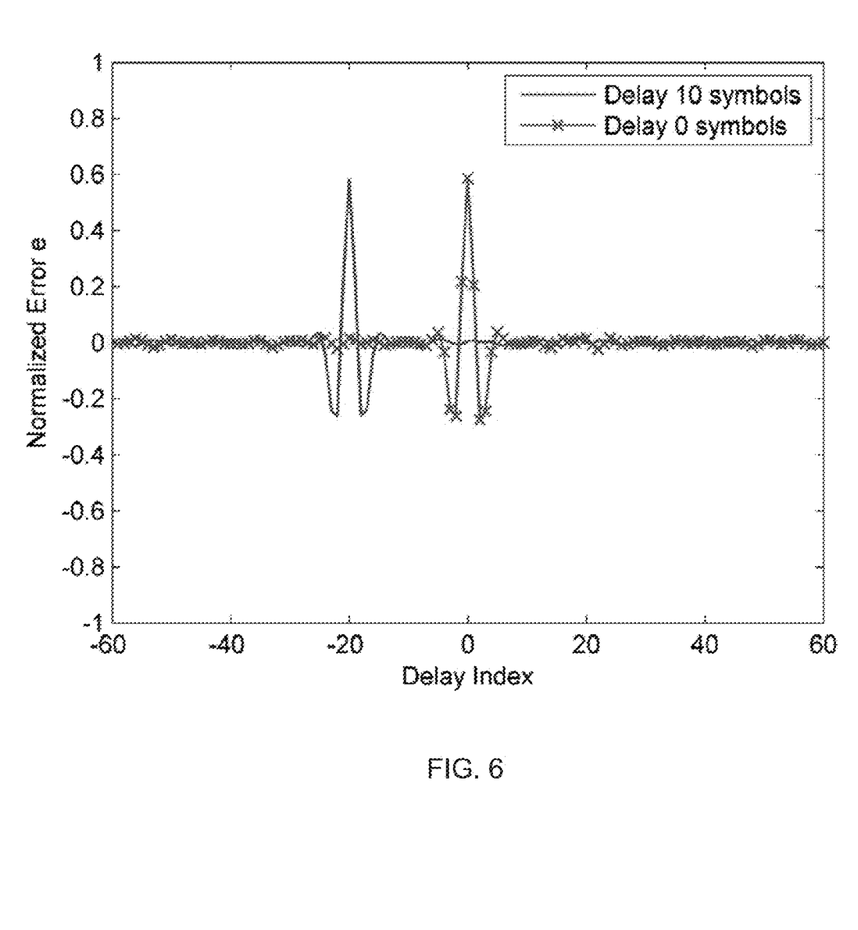
FIG. 6 shows an example of the calculated error signal versus the index delay of the Q-tributary relative to the I-tributary where a time skew of 10-symbols was added for the x-polarization channel (solid line) and no delay was present on the y-polarization channel (crossed line), according to an embodiment.

FIG. 6 shows an example of the calculated error signal versus the index delay of the Q-tributary relative to the I-tributary where a time skew of 10-symbols was added for the x-polarization channel (solid line) and no delay was present on the y-polarization channel (crossed line), according to an embodiment. In the example of FIG. 6, the symbol rate for the received signal is 31.6 Gbaud, the frequency offset is set to 15 GHz, the sampling rate is set to 2× the symbol rate, and the modulation format is QPSK. FIG. 6 shows the error signal "e" can accurately calculate, identify or determine the time skew on both the x-polarization channel (time skew of 10 symbols or 20 samples at 2 samples/symbol sampling rate) and the y-polarization channel (time skew of 0 symbols). A normalized equation for the error signal "e" can be used to make the error signal insensitive to input power fluctuation as follows where the denominator is added to represent the total power of the signal:

$$e = \frac{\langle Q_n I_{n-1} - I_n Q_{n-1} \rangle}{\langle Q_n^2 + I_n^2 \rangle} \quad (2)$$

The time skew can be adjusted within a threshold (e.g., 10% of the symbol duration) to minimize or reduce the system penalty (e.g., at 31.6 Gsymbols/s, the time skew has to be limited to ±3 ps). Because the error signal is calculated in the digital domain, the time skew precision of the proposed technique is inversely proportional to the sampling rate $R_s$ as:

$$\Delta \text{Skew}_{digital} = \pm \frac{1}{2R_s}. \quad (3)$$

At a sampling rate of $R_s=2\times R$ (R is the symbol rate), the time skew precision corresponds to $\Delta \text{Skew}_{digital}=\pm 0.25/R$, which is 25% of the symbol duration (1/R). In some instances, the digital retiming is not sufficient to obtain the target time skew precision threshold (e.g., 10% of the symbol duration at 2×R over-sampling). An additional step can be used to calculate the intrasymbol portion of the time skew to increase the time skew precision. Two methods are available to calculate the intrasymbol portion of the time skew. Each is discussed below.

The first method includes resampling (interpolating) the digital data that can be performed until the time skew is resolved within the threshold (e.g., 10% of the symbol duration). For example, a sampling rate of $R_s=16\times R$ results in a precision within 6% of the symbol duration that meets the 10% threshold goal. The receiver local oscillator (LO) frequency can be set to obtain an overall frequency offset between the optical carrier signal associated with the transmitter and the LO of approximately ½R, where R is the symbol rate. The ADC samples are captured at a sampling rate of $R_s$ (in this example $R_s=2R$, but a lower sampling rate can be used). The digitized data captured by the ADCS are resampled at, for example, a processor at a rate of $R_s=16$ R (to obtain better than 10% of 1/R time skew precision) to produce a set of index delays. The digital delay of the Q tributary is shifted by one sample relative to the I tributary and the normalized error signal is calculated according to Eq. (2) above. The steps discussed above are repeated until the normalized error signal "e" is maximized. The position of the maximized error signal "e" corresponds to the best time alignment between the I-tributary and the Q-tributary of the coherent optical receiver. The method includes calculating the integer portion of the time skew (intersymbol portion of the time skew) and the remaining fractional portion of the time skew (i.e., time skew=intersymbol portion of time skew+intrasymbol portion of time skew).

The fractional portion of the time skew can be referred as the intra UI time skew (or the intrasymbol portion of the time skew) as shown in FIG. 4. The fractional portion of the time skew is determined, calculated or identified by first changing the ADC sampling point of the corresponding Q-tributary by the intrasymbol time skew calculated above. The method further includes adding a delay to the Q-tributary corresponding to the integer number of symbols calculated (i.e., correcting for the intersymbol portion of the delay). The delay is applied at the processing rate of the coherent optical receiver. The LO laser frequency is then set back to obtain a frequency offset of substantially zero with respect to the optical carrier signal associated with the transmitter.

The second method does not use resampling, but instead first adjusts the ADCs to maximize the precision of the ADCs. A set of index delays are swept and the normalized error signal "e" is calculated similar to the method described above. These steps discussed are repeated until the normalized error signal "e" is maximized. Note that the second method does not involve resampling of the digital data, but instead uses the ADC set with its maximum precision. The second method includes changing the sampling point of the ADCs (which can usually be set with sufficient accuracy). The sampling point can be adjusted by changing the phase of the incoming clock used in the ADCs. This method, however, involves a feedback and fast communication to the ADCs.

Figure 7:
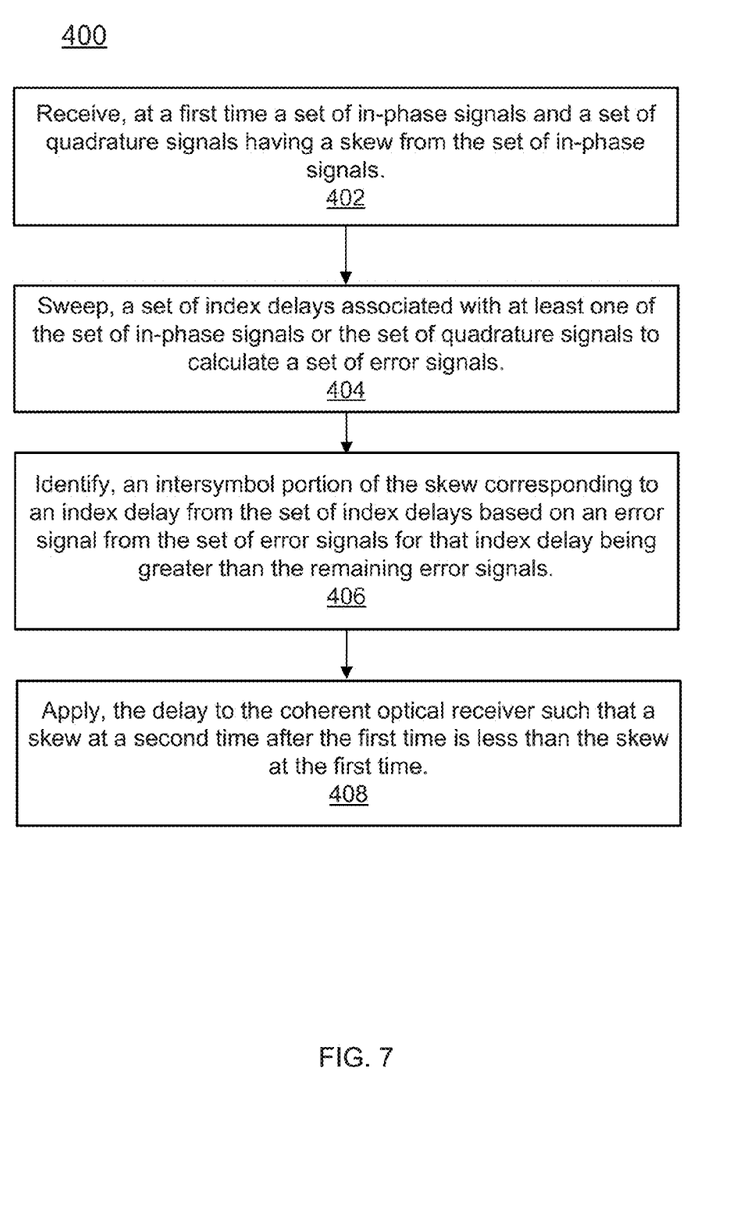
FIG. 7 is a flow chart showing the method for the intersymbol skew (or delay) detection and correction, according to an embodiment.

FIG. 7 is a flow chart showing the method for the intersymbol skew (or delay) detection and correction, according to an embodiment. The method 400 includes receiving at, for example, a coherent optical receiver, at a first time a set of in-phase signals and a set of quadrature signals having a skew from the set of in-phase signals, at 402. As described above, the in-phase signals and the quadrature signals are received from a coherent optical transmitter. At 404, a set of index delays associated with at least one of the set of in-phase signals or the set of quadrature signals is swept to calculate a set of error signals. The calculation of the error signal is done according to the equations described above (Eq. 1-3) and can be performed at a processor. The error signal calculation can be performed either in real time or offline.

At 406, the intersymbol portion of the skew is identified that corresponds to an index delay from the set of index delays where the error signal from the set of error signals for that index delay is greater than the remaining error signals. As described above, the coherent optical receiver can sweep a set of index delays associated with at least one of the set of in-phase signals or the set of quadrature signals to calculate a set of error signals associated with a difference between the wavelength of the local oscillator signal associated with the coherent optical receiver and an optical carrier signal associated with the transmitter. The intersymbol portion of the delay corresponds to an index delay from the set of index delays when an error signal from the set of error signals for that index delay is greater than the remaining error signals. The intersymbol portion of the skew is the skew associated with multiple symbol unit intervals.

At 408, the delay is applied to the coherent optical receiver such that a skew at a second time after the first time is less than the skew at the first time. As described above, the delay is applied by the delay modules to compensate for the skew between the in-phase portion (I-tributary) and the quadrature portion (Q-tributary) of the coherent optical receiver. The delay modules can receive a delay signal from the processor and can introduce both the intersymbol delays and intrasymbol delays into at least one of the I-tributary or Q-tributary or both tributaries of the optical coherent receiver to compensate for the skew. Alternatively, a delay module can also be associated with each of the four digitized data streams representing the $EI_x$, $EQ_x$, $EI_y$, and $EQ_y$ portions of the received signal.

Alternatively, in other configurations, the intrasymbol portion of the skew can be detected and compensated by a second method that does not use resampling of the digitized data streams, but instead adjusts the ADCs to maximize the precision of the ADCs. A set of index delays are swept and the set of normalized error signals are calculated similar to the method described above. These steps are repeated until the normalized error signal is maximized. Note that the second method does not involve resampling of the digital data, but instead uses the ADC set with its maximum precision. The second method includes changing the sampling point of the ADCs (which can usually be set with sufficient accuracy). The sampling point can be adjusted by changing the phase of the incoming clock used in the ADCs.

Figure 8:
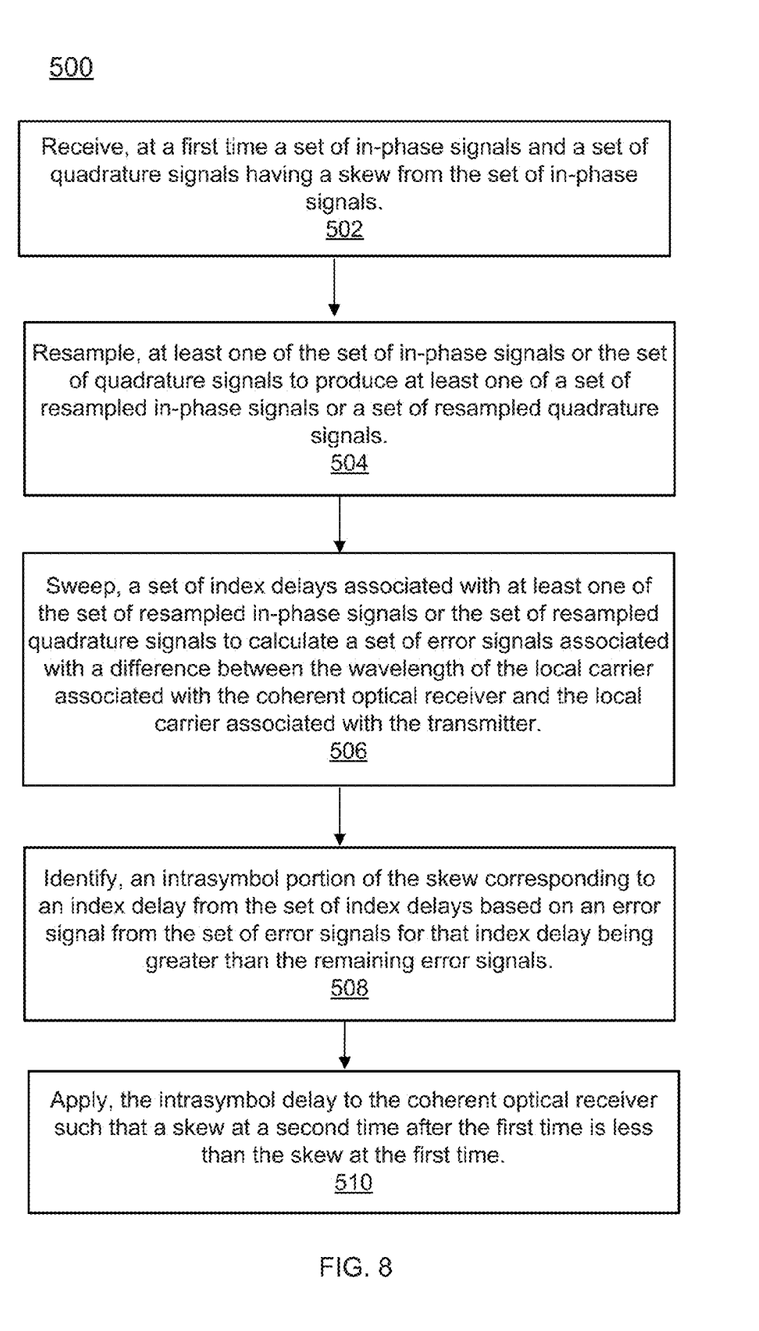
FIG. 8 is a flow chart showing a method for the intrasymbol skew (or delay) detection and correction, according to an embodiment.

FIG. 8 is a flow chart showing a method for the intrasymbol skew (or delay) detection and correction, according to an embodiment. The method 500 includes receiving at for example, a coherent optical receiver, at a first time a set of in-phase signals and a set of quadrature signals having a skew from the set of in-phase signals, at 502. As described above, the in-phase signals and the quadrature signals are sent from a coherent optical transmitter. At 504, the digitized data stream representing at least one of the set of in-phase signals or the set of quadrature signals of the received signal are resampled, to produce at least one of a set of resampled in-phase signals or a set of resampled quadrature signals. The re-sampling of the digitized data stream is performed at a processor associated with the coherent optical receiver.

At 506, a set of index delays associated with at least one of the set of resampled in-phase signals or the set of resampled quadrature signals is swept at, for example, the processor to calculate a set of error signals associated with a difference between the wavelength of the local oscillator signal associated with the coherent optical receiver and an optical carrier signal associated with the transmitter. As described above, the calculation of the error signal is done according to the equations described above (Eq. 1-3) and can be performed at a processor. The error signal calculation can be performed either in real time or offline. At 508, an intrasymbol portion of the skew is identified that corresponds to an index delay from the set of index delays based on an error signal from the set of error signals for that index delay being greater than the remaining error signals. The intrasymbol portion of the skew is the skew associated with sub-symbol unit intervals (less than one UI).

At 510, the intrasymbol portion of the delay is applied to the coherent optical receiver such that a skew at a second time after the first time is less than the skew at the first time. As described above, the delay is applied by the delay modules to compensate for the skew between the in-phase portion (I-tributary) and the quadrature portion (Q-tributary) of the optical coherent receiver. The delay modules can receive a delay signal from the processors and can introduce both the intersymbol delays and intrasymbol delays into at least one of the I-tributary or the Q-tributary or both tributaries of the optical coherent receiver to compensate for the skew. Additionally, the delay modules can also be associated with all four digitized data streams representing the $EI_x$, $EQ_x$, $EI_y$, and $EQ_y$ portions of the received signal.

As described above, FIG. 7 relates to a method for the detection and correction of the intersymbol portion of the I/Q skew and FIG. 8 relates to a method for the detection and correction of the intrasymbol portion of the I/Q skew. In some embodiments, the I/Q skew detection and correction method can involve the detection and correction of only the intersymbol portion of the I/Q skew (i.e., the method described in FIG. 7). In other embodiments, the I/Q skew detection and correction method can involve the detection and correction of only the intrasymbol portion of the I/Q skew (i.e., the method described in FIG. 8). In yet other embodiments, the I/Q skew detection and correction method can involve the detection and correction of both the intersymbol portion of the I/Q skew and the intrasymbol portion of the I/Q skew (i.e., the method described in FIG. 7 followed by the method described in FIG. 8).

The method to calculate the time skew between the I and Q tributaries of the coherent optical received described in FIGS. 1-8 is blind and does not involve special training sequences. This facilities transmitter and receiver design and allows interoperability with other products. The proposed method can detect very large time skews. Methods for time skew detection and compensation that are based on training sequences, typically, have limited time skew detection range. The proposed technique is robust to optical impairments like optical noise, polarization mode dispersion (PMD) and to unsynchronized sampling clock.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. For example, although the above discussion referred to horizontal and vertical polarization, it should be understood that other types of polarization can be used such as circular polarization (clockwise and counter-clockwise). For another example, although FIG. 3 shows compensation being performed at the I-tributaries, such compensation can alternatively be performed at the Q-tributaries. Where methods described above indicate certain events occurring in certain order, the ordering of certain events may be modified. Additionally, certain of the events may be performed concurrently in a parallel process when possible, as well as performed sequentially as described above.

What is claimed is:

1. An apparatus, comprising:
a coherent optical receiver configured to receive during a first time period a plurality of in-phase signals and a plurality of quadrature signals having a skew from the plurality of in-phase signals, the plurality of the in-phase signals and the plurality of quadrature signals being associated with a local oscillator signal having a wavelength different from a wavelength of an optical carrier signal associated with a transmitter, the coherent optical receiver configured to sweep a plurality of index delays associated with at least one of the plurality of in-phase signals or the plurality of quadrature signals to calculate a plurality of error signals associated with a difference between the wavelength of the local oscillator signal associated with the coherent optical receiver and the wavelength of the optical carrier signal associated with the transmitter such that a delay between the plurality of in-phase signals and the plurality of quadrature signals is blindly determined, the delay having an intersymbol portion and an intrasymbol portion, the coherent optical receiver configured to apply the delay at a second time after the first time period such that a skew after the second time is less than the skew at the first time period.

2. The apparatus of claim 1, wherein the coherent optical receiver is configured to receive the plurality of in-phase signals and the plurality of quadrature signals during the first time period over an optical link having at least one of optical noise, chromatic dispersion, polarization mode dispersion or an unsynchronized sampling clock.

3. The apparatus of claim 1, wherein the coherent optical receiver is configured to receive the plurality of in-phase signals and the plurality of quadrature signals during the first time period over an optical link having optical noise, chromatic dispersion, polarization mode dispersion and an unsynchronized sampling clock.

4. The apparatus of claim 1, wherein:
the coherent optical receiver has a portion associated with a first polarization and a portion associated with a second polarization orthogonal to the first polarization, the skew being associated with the first polarization,
the coherent optical receiver configured to receive during the first time period a plurality of in-phase signals associated with the second polarization and a plurality of quadrature signals associated with the second polarization having a skew from the plurality of in-phase signals associated with the second polarization, the coherent optical receiver configured to blindly determine a delay between the plurality of in-phase signals associated with the second polarization and the plurality of quadrature signals associated with the second polarization based on the plurality of in-phase signals associated with the second polarization and the plurality of quadrature signals associated with the second polarization, the delay associated with the second polarization having an intersymbol portion and an intrasymbol portion, the coherent optical receiver configured to apply the delay associated with the second polarization at a second time after the first time period such that a skew associated with the second polarization after the second time is less than the skew at associated with the second polarization the first time period.

5. The apparatus of claim 1, wherein
the intersymbol portion of the delay corresponding to an index delay from the plurality of index delays when an error signal from the plurality of error signals for that index delay is greater than the remaining error signals.

6. The apparatus of claim 1, wherein:
the coherent optical receiver configured to resample at least one of the plurality of in-phase signals or the plurality of quadrature signals to produce at least one of a plurality of resampled in-phase signals or a plurality of resampled quadrature signals,
the coherent optical receiver configured to sweep the plurality of index delays associated with the at least one of the resampled plurality of in-phase signals or the plurality of resampled quadrature signals to calculate the plurality of error signals associated with the difference between the wavelength of the local oscillator signal associated with the coherent optical receiver and the wavelength of the optical carrier signal associated with the transmitter, the intrasymbol portion of the delay corresponding to an index delay from the plurality of index delays when an error signal from the plurality of error signals for that index delay is greater than the remaining error signals.

7. The apparatus of claim 1, wherein the delay after the second time is no greater than 10% of a symbol interval unit associated with the plurality of in-phase signals and the plurality of quadrature signals.

8. The apparatus of claim 1, wherein the coherent optical receiver is configured to apply the delay at an analog-to-digital converter associated with at least one of an in-phase portion of the coherent optical receiver or a quadrature portion of the coherent optical receiver.

9. An apparatus, comprising:
an coherent optical receiver configured to receive from a transmitter during a first time period a plurality of in-phase signals and a plurality of quadrature signals having a skew from the plurality of in-phase signals, the plurality of the in-phase signals and the plurality of quadrature signals being associated with a local oscillator signal having a wavelength different from a wavelength of an optical carrier signal associated with a transmitter,
the coherent optical receiver configured to sweep a plurality of index delays associated with at least one of the plurality of in-phase signals or the plurality of quadrature signals to calculate a plurality of error signals associated with a difference between the wavelength of the local oscillator signal associated with the coherent optical receiver and the wavelength of the optical carrier signal associated with the transmitter, an intersymbol portion of a delay corresponding to an index delay from the plurality of index delays when an error signal from the plurality of error signals for that index delay is greater than the remaining error signals,
the coherent optical receiver configured apply the delay such that a skew at a second time after the first time period is less than the skew at the first time period.

10. The apparatus of claim 9, wherein:
the coherent optical receiver configured to apply the delay without using a training signal, the delay having an intrasymbol portion.

11. The apparatus of claim 9, wherein the coherent optical receiver is configured to receive the plurality of in-phase signals and the plurality of quadrature signals during the first time period over an optical link having at least one of optical noise, chromatic dispersion, polarization mode dispersion or an unsynchronized sampling clock.

12. The apparatus of claim 9, wherein the coherent optical receiver is configured to receive the plurality of in-phase signals and the plurality of quadrature signals during the first time period over an optical link having optical noise, chromatic dispersion, polarization mode dispersion and an unsynchronized sampling clock.

13. The apparatus of claim 9, wherein:
the coherent optical receiver has a portion associated with a first polarization and a portion associated with a second polarization orthogonal to the first polarization, the skew being associated with the first polarization,
the coherent optical receiver configured to receive during the first time period a plurality of in-phase signals associated with the second polarization and a plurality of quadrature signals associated with the second polarization having a skew from the plurality of in-phase signals associated with the second polarization,
the coherent optical receiver configured to sweep a plurality of index delays associated with at least one of the plurality of in-phase signals associated with the second polarization or the plurality of quadrature signals associated with the second polarization to calculate a plurality of error signals associated with the second polarization and associated with a difference between the wavelength of the local oscillator signal associated with the coherent optical receiver and the the wavelength of optical carrier signal associated with the transmitter, an intersymbol portion of a delay associated with the second polarization corresponding to an index delay from the plurality of index delays associated with the second polarization when an error signal from the plurality of error signals associated with the second polarization for that index delay is greater than the remaining error signals,
the coherent optical receiver configured apply the delay associated with the second polarization to an analog-to-digital converter associated with the second polarization of the coherent optical receiver such that a skew associated with the second polarization at the second time is less than the skew at the first time period.

14. The apparatus of claim 9, wherein:
the coherent optical receiver configured to resample at least one of the plurality of in-phase signals or the plurality of quadrature signals to produce at least one of a plurality of resampled in-phase signals or a plurality of resampled quadrature signals,
the coherent optical receiver configured to sweep a plurality of index delays associated with the at least one of the resampled plurality of in-phase signals or the plurality of resampled quadrature signals to calculate a plurality of error signals associated with a difference between the wavelength of the local oscillator signal associated with the coherent optical receiver and the wavelength of the optical carrier signal associated with the transmitter, the intrasymbol portion of the delay corresponding to an index delay from the plurality of index delays when an error signal from the plurality of error signals for that index delay is greater than the remaining error signals.

15. The apparatus of claim 9, wherein:
the plurality of error signals is a first plurality of error signals, the plurality of index delays is a first plurality of index delays;
the coherent optical receiver configured to maximize a precision of an analog-to-digital converter (ADC) of the coherent optical receiver;
the coherent optical receiver to calculate a second plurality of error signals, after the precision of the ADC has been maximized;
the coherent optical receiver configured to sweep, after the precision of the ADC has been maximized, a second plurality of index delays associated with the at least one of the plurality of in-phase signals or the plurality of quadrature signals to identify the intrasymbol portion of the delay corresponding to an index delay from the second plurality of index delays when an error signal from the second plurality of error signals for that index delay is greater than the remaining error signals.

16. The apparatus of claim 9, wherein the delay after the second time is no greater than 10% of a symbol interval unit associated with the plurality of in-phase signals and the plurality of quadrature signals.

17. A method, comprising:
receiving, at a coherent optical receiver, at a first time a plurality of in-phase signals and a plurality of quadrature signals having a skew from the plurality of in-phase signals;
sweeping a plurality of index delays associated with at least one of the plurality of in-phase signals or the plurality of quadrature signals to calculate a plurality of error signals;
identifying an intersymbol portion of a delay corresponding to an index delay from the plurality of index delays based on an error signal from the plurality of error signals for that index delay being greater than the remaining error signals; and
applying the delay to the coherent optical receiver such that a skew at a second time after the first time is less than the skew at the first time.

18. The method of claim 17, wherein the applying includes applying the delay without using a training signal, the delay having an intrasymbol portion.

19. The method of claim 17, wherein the receiving the plurality of in-phase signals and the plurality of quadrature signals during the first time period includes receiving the plurality of in-phase signals and the plurality of quadrature signals over an optical link having at least one of optical noise, chromatic dispersion, polarization mode dispersion or an unsynchronized sampling clock.

20. The method of claim 17, wherein the receiving the plurality of in-phase signals and the plurality of quadrature signals during the first time period includes receiving the plurality of in-phase signals and the plurality of quadrature signals over optical link having an optical noise, chromatic dispersion, polarization mode dispersion and an unsynchronized sampling clock.

21. The method of claim 17, further comprising:
resampling at least one of the plurality of in-phase signals or the plurality of quadrature signals to produce at least one of a plurality of resampled in-phase signals or a plurality of resampled quadrature signals; and
sweeping a plurality of index delays associated with the at least one of the resampled plurality of in-phase signals or the plurality of resampled quadrature signals to calculate a plurality of error signals associated with a difference between the wavelength of a local oscillator signal associated with the coherent optical receiver and the wavelength of an optical carrier signal associated with the transmitter, the intrasymbol portion of the delay corresponding to an index delay from the plurality of index delays when an error signal from the plurality of error signals for that index delay is greater than the remaining error signals.

* * * * *